Aug. 25, 1959  G. N. HARVEY  2,900,736
SYSTEM FOR CORRECTION OF MAGNETIC COMPASSES
Filed Feb. 25, 1957  2 Sheets-Sheet 1

Inventor
GILBERT N. HARVEY
By
Herbert H. Thompson
Attorney

Inventor
GILBERT N. HARVEY
By Herbert H. Thompson
Attorney

United States Patent Office 2,900,736
Patented Aug. 25, 1959

2,900,736

SYSTEM FOR CORRECTION OF MAGNETIC COMPASSES

Gilbert Nathaniel Harvey, Colnbrook, England, assignor to The Sperry Gyroscope Company Limited, Brentford, Middlesex, England, a company of Great Britain Application February 25, 1957, Serial No. 642,000

6 Claims. (Cl. 33—224)

This invention relates to magnetic compasses for use on vehicles (which term is here used to include ships and aircraft as well as land vehicles) largely constructed of magnetic material or containing equipment of significant bulk consisting of magnetic material.

The invention may also be extended to provide a dip-angle meter, which may be regarded as a magnetic compass operating in a vertical plane.

An ordinary magnetic compass on a vehicle is subject to deviation errors arising as a result of the deviating fields produced by the induced or permanent magnetisation of the magnetic material in the vehicle. The deviating field at the position of the compass combines vectorially with the earth's field to produce a resultant field which is normally deviated from the direction of the earth's field. The magnetic compass responds to this and indicates the direction of the resultant field so that the compass indicates the wrong direction. The error is the deviation error. It is, in general, not possible to position a compass on a vehicle in a position so far removed from the magnetic material in the vehicle that the compass is not subject to the deviation fields.

In ordinary compass installations the deviation error is corrected by methods that involve the analysis of the deviating field at the location of the compass into components and the separate neutralisation of these components by separate adjustments made to a plurality of correctors. Thus for neutralising the components of the deviating field due to induced magnetisation soft iron correctors such as spheres and a Flinders bar are used, and for correcting the components due to permanent magnetism permanent magnets are used. These correctors are mounted in the vicinity of the magnetic compass to produce local deviating fields intended to neutralise at the compass the component of the deviating field due to the magnetic material of the vehicle.

Such correctors are not fully satisfactory. One reason is that it is often found that that part of the magnetism of the structure of the vehicle which behaves as permanent during the process of adjusting a compass to correct it for deviation errors is liable to change afterwards to an unpredictable extent in strength and even in sign. This is especially true of vehicles that are particularly subject to vibration.

Another reason why existing methods of compass correction are unsatisfactory arises from the difficulty of the process of correctly adjusting the correctors, since before this can be done the relative proportions of the deviating field at the compass due to permanent and induced magnetisation must be correctly assessed. However, tests carried out in one locality only cannot correctly determine the relative proportion of the induced and permanent deviating fields and therefore do not enable the correct adjustments for the corrector under all circumstances to be fully ascertained. To do this correctly it would be necessary to carry out tests in widely spaced places on the earth's surface where the vertical and horizontal components of the earth's field differ considerably. This is not always possible, and the results even of such tests may in any case be difficult to interpret because the magnetisation of the vehicle may have changed during its move from one of the test positions to the other.

Finally, in the existing systems of compass correction it is rarely possible to compensate correctly for the effects of heeling error, because there is no practical type of correcting device that corrects for the component of the induced deviating field at right angles to the deck of the vehicle.

As has been stated, compass correctors hitherto used exercise their corrective action by means of local deviating fields produced by the correction devices in the vicinity of the compass. The adjustments that have to be made to them are adjustments in position of the several magnetic masses constituting the correction devices to place them in positions where the local deviating fields that they produce neutralize at the compass the main deviating field produced by the main bulk of magnetic material in the vehicle, and does so on all headings of the vehicle.

In contrast to this method of effecting correction, the present invention is intended and adapted to make use of a completely different principle for correcting deviation errors, according to which the deviation error that would appear in an ordinary magnetic compass due to the action on it of the main deviating field system produced by the main bulk of magnetic material of the vehicle is corrected by means of a compensating action which also is due to the deviating field system produced by the main bulk of magnetic material of the vehicle. In other words, the same cause as produces deviation is used to correct the deviation.

To make proper use of the new method of compass correction relied on for the correct operation of the invention it is necessary that the apparatus of the invention shall be suitably installed on the vehicle as hereinafter described.

The principle relied on, that deviation errors are to be corrected by a corrective action dependent on the deviating field system that produces the errors, has the consequence that the adjustments that have to be made to the apparatus, when it is correctly installed, in order to correct ascertained deviation errors, are of extreme simplicity as compared with the adjustments provided in previous correction systems. In fact, the adjustments reduce to a single adjustment which determines the magnitude of the deviation-correcting effect. This single adjustment compensates at one stroke for the errors due to all the components of the deviating field, in marked contrast to previous correction systems, which involve making separate adjustments to a plurality of correction devices to correct separately each component of the deviating field. Clearly the compensation must remain correct on all headings of the vehicle.

The principle on which the correction is made, and which the apparatus of the invention is intended to utilise, has the further advantage that, when the apparatus is installed and correctly adjusted, it will operate thereafter without further adjustment to correct the deviation errors, even though the magnetisation of the magnetic material of the vehicle, and consequetnly the deviating field at the location of a magnetic-field responsive unit of the system due to this cause, may alter both in strength and direction. This result is secured because the correction effect also alters when the deviating field at the location of the unit alters, and alters in the same manner as the deviating field. In consequence, once the apparatus has been correctly set, no further adjustment is necessary.

For the same reason again, heeling error is automatically corrected without any additional magnetic or other correction. The deviation of the magnetic field device may change when the ship heels, but the correction effect also changes and in the same manner as the deviating field, so that the deviation error remains corrected.

The apparatus of the present invention is designed to enable compass correction to be effected in accordance with this principle.

According to the invention there is provided a plurality of similar magnetic-field-detector units adapted to be mounted separately at spaced locations (as hereinafter defined) fixed relative to a vehicle and each adapted to provide compass data defining its own orientation relative to the earth's field, such data, however, being subject to deviation errors due to the magnetic-deviating field present at the location of the unit, and correlating means adapted to receive the data from the detector units and to provide under the joint control of the said data an output, e.g. a compass indication, having a relationship to said data, the correlating means including weighting means set, or settable, to cause the data provided by one detector unit to influence the output of the correlating means more strongly than do the data provided by another detector unit.

In the simplest and generally preferred form the invention employs only two magnetic-field-detector units. This form of the invention is intended to make use of the fact that in, or in the close vicinity of, a vehicle consisting largely of magnetic material, or carrying considerable magnetic material, there exist, generally outside the body of the vehicle, pairs of points the deviating fields at which bear a constant ratio to each other differing significantly from unity and which are parallel to each other, and remain so on all headings of the vehicle and under all reasonable conditions of magnetisation of the body whether induced or permanent. The two points of such a pair must naturally be spaced at some distance from each other if the deviating fields at the two points are to differ considerably in magnitude.

It is intended that the two detector units used in the above-mentioned preferred form of the invention shall be mounted one at each of the points of a pair of points having the described property. For this purpose the two units must be capable of being mounted separately at two points spaced sufficiently for the deviating fields at the points to differ considerably in magnitude. If and when the apparatus has been installed as specified, the weighting means in the correlating means of the apparatus may be set so that the data from the detector unit nearer to the bulk of magnetised magnetic material that is responsible for producing the deviating field has less influence on the output of the correlating means that the data from the farther detector unit; in fact, so that the influences exercised by the two detector units are in the inverse ratios of the strengths of the deviating fields at the locations of the two units. Furthermore, the correlating means can be set to be influenced by the two sets of data in such a manner that the effect of the deviating field at the first detector unit in producing errors in the output of the correlating means is in the opposite sense to the effect of the deviating field at the second unit in producing such errors. By satisfying both these conditions the output of the correlating means can be made to depend substantially solely on the direction of the earth's magnetic field relative to the vehicle, so that the compass heading indicated, or other related output quantity constituting the output of the correlating means, is substantially free from deviation errors due to the deviating fields produced at the locations of the two detector units.

In preferred embodiments of the invention the magnetic detector units are magnetometers providing output compass data in response not merely to the angular position, relative to the unit, of the resultant field existing at the location of the unit (the resultant of the earth's field and of the deviating field due to magnetisation of the magnetic material of the vehicle) but also to the magnitude of the resultant field, each output datum quantity being a measure of the component of the resultant magnetic-field vector along an axis of the unit. Preferably, also, the correlating means correlates the data quantities vectorially as vector quantities; by this is meant that the correlating means operates to provide an output that is a function of a vector quantity that is itself a vector function of two vector quantities each derived from the data provided by one of the two detector units, and is not a function merely of the angular position of these vector quantities with respect to the vehicle. This point will become clearer in connection with the explanation given below of the operation of the system of Fig. 1, since that system is one of the class referred to in which the correlating means does operate in dependence on a vector function of vector quantities provided by the detector units as compass data.

Some embodiments of the invention will now be described by way of example.

Figure 1:
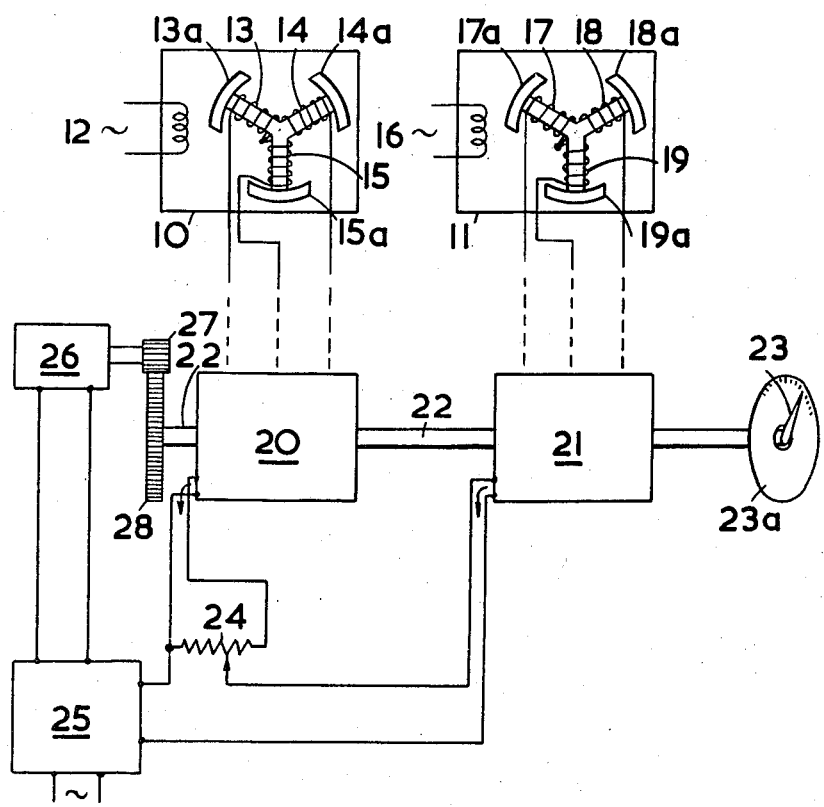
Fig. 1 is a diagram of a preferred embodiment of the invention using two detector units which are of the magnetometer type.

In Fig. 1 10 and 11 are the two detector units which are of a kind in general use.

Each unit comprises an outer casing by which it can be fixed to the main structure of the vehicle so as to have a constant azimuth relationship to the vehicle's fore-and-aft axis, in which casing the magnetic-field-detecting element of the unit is pendulously mounted with freedom to tilt through 25° in roll or in pitch. Pendulous mounting ensures that the plane of the detecting element remains horizontal in spite of roll and pitch inclinations of the vehicle up to 25°.

The detecting element proper consists of a core of magnetic material carrying windings. The core consists of two dished plates spaced apart to lie in parallel planes, the plates consisting of three radiating arms similar to the spokes of a wheel, and provided at their ends with "flux collectors" 13a, 14a, 15a, or 17a, 18a, 19a, similar to portions of the rim of the wheel. The two plates or discs are joined at their centre by a hub extending at right angles to the plates. This hub also consists of magnetic material and forms part of the core. Seen in plan the core as a whole thus resembles a wheel with a hub and three spokes 13, 14, 15, or 17, 18, 19, and an incomplete rim of three arcuate segments. Each spoke consists of two spaced flat strips of magnetic material, and each segment of the rim consists of two spaced flat arcuate strips. The pendulous mounting of the element normally maintains the plane of the wheel horizontal. An exciter winding 12 or 16 is wound round the central hub and a secondary or pick-off winding is wound round each spoke.

It is intended that in operation the exciter winding 12 or 16 will be energized with single-phase alternating current at a frequency of 400 cycles per second to induce alternating magnetic flux in all three spokes of the core, the peak value of which corresponds to partial saturation of the core. As a result, alternating-current signal voltages at 800 cycles per second are induced in each of the pick-up coils, the amplitude of any one such signal voltage being proportional to the component of the total magnetic field along the axis of the arm on which the coil is wound.

The three pick-off windings of each detector unit are connected together and to three output lines, in Y-connection, so that, when the apparatus is in operation, output signal voltages are provided between each pair of these lines dependent on the signal voltages generated in the two windings that are connected in series between the two lines of that pair. These line signal voltages are fed to the windings of the stator of a resultant-field inductive device 20, which may be, and is hereinafter supposed to be, a standard selsyn signal-generator, or control-transformer synchro, 20. Similarly, the signal voltages from the detector unit 11 are fed to the windings of the stator of a similar device 21. The rotors of the synchros 20 and 21 are locked so as to turn together, and the common rotor shaft 22 is connected to be driven through gearing 27, 28 by a servo motor 26. The shaft 22 is provided with a pointer 23 which moves angularly to provide compass indications on an associated compass scale 23a.

The line signal voltages applied to the windings of the stators of synchros 20 or 21 produce currents in these windings, which in turn produce resultant alternating magnetic-flux fields in the stators. The orientation of the resultant alternating field in either stator winding, in a plane normal to the axis of shaft 22, will depend on the relative magnitudes of the signal voltages from the windings 13, 14, 15, or 17, 18, 19, of the associated detector unit, and will therefore in turn depend on the orientation of the magnetic field present at the location of the detector unit 10 or 11 relative to the directions of the three arms 13, 14, 15, or 17, 18, 19, of that unit; or, otherwise expressed, on the orientation of the detector unit in the magnetic field at the location of that unit. The amplitude of the alternating field in the stator will be substantially independent of the orientation of the detector unit in the resultant magnetic field at the location of the detector unit, but will depend on the intensity of the horizontal component of that field. In fact, in such apparatus the resultant alternating field in the stator, considered as a vector quantity defined by its amplitude and by the direction of its axis relative to the stator, is proportional to the horizontal component of the magnetic field at the location of the detector, considered as a vector quantity defined by its intensity and its direction relative to the detector element of the detector unit.

We may define the reference position of the resultant alternating-field vector in the stator as that position in which the axis of the resultant field lies when the horizontal magnetic-field vector at the location of the detector unit is aligned with the reference axis of the detector unit. Whenever the horizontal magnetic-field vector at the detector unit turns in azimuth through a certain angle from this reference position with respect to the detector unit, the alternating-field vector in the stator of the corresponding synchro about the axis of the synchro will turn through the same angle from its reference position in the stator.

Since the rotor windings of synchros 20 and 21 lie in the alternating fields produced by the respective stator windings, alternating voltages will be induced in them. These voltages constitute the outputs of the respective synchros. The output voltage from each of the synchros is proportional to the amplitude of the alternating magnetic field produced by the stator of that synchro, and to the cosine of the angle between the direction of that field and the direction of the axis of the rotor winding. Thus it is proportional to the component, resolved along the axis of the rotor winding, of the resultant alternating field produced by the stator. If the rotor is turned, the output voltage changes; it becomes zero in that angular position of the rotor in which the axis of the rotor winding is perpendicular to the axis of the resultant alternating field produced by the stator, that is to say, when it is perpendicular to the alternating-field vector of that synchro.

The detector units 10, 11, are similar to each other in construction and performance, and so also are the synchros 20, 21, to which the detector units are connected, and the apparatus is normally set up so that the two combinations, of detector unit 10 and synchro 20 on the one hand, and detector unit 11 and synchro 21 on the other hand, have the same zero. For this purpose the stators of the two synchros may be locked with such orientations about the axis of shaft 22 that the reference positions of the axes of the alternating fields in the stators are parallel, in which case the rotors of the two synchros are locked to shaft 22 with the axes of the rotor windings in the same angular positions about the axis of the shaft.

It follows that, if the two detector units are similarly oriented in the same magnetic field, so that the three line voltages from one of the detector units are the same as the three line voltages from the other detector unit, the alternating magnetic fields in the stators of the two synchros 20, 21 will have the same angular position about the axis of shaft 22. Therefore, if shaft 22 is turned to the angular position that sets the axis of the rotor winding of synchro 20 at right angles to the resultant alternating field in the stator of synchro 20, to give zero output from the rotor winding, the same angular position of shaft 20 will also set the rotor winding of synchro 21 at right angles to the resultant alternating field in the stator of synchro 21. Both rotor windings will thus give zero output in the same angular position of shaft 22, which is what is meant by saying that the two synchros have the same zero. At any other angular position of the shaft 22 the two rotor windings will give equal outputs, provided that the two detector units 10 and 11 are similarly oriented in the same magnetic field or in parallel fields having equal intensities.

It is intended that the detector units 10, 11 will normally be mounted on a vehicle with similar orientations with respect to the vehicle. For this purpose the units are provided with reference marks or other means to enable them to be mounted so that the reference axis in the detector element of the detector unit lies parallel to the fore-and-aft axis of the vehicle.

The angular position of the shaft 22 relative to the stators of synchros 20, 21, is indicated by the pointer 23 relative to a reference or zero position on the compass scale 23a. The angular position of the compass scale 23a relative to the stators of synchros 20, 21 will normally be set so that, if the reference axes of the detector units, 10, 11 lie in the magnetic meridian in a locality not influenced by deviation fields, and if the rotors of synchros 20, 21 are then in their neutral position with respect to the stators of the synchros, the pointer 23 will indicate zero, or north, on the scale 23a. Thus the zero, or north, indication on the compass scale corresponds (in the absence of deviating fields) to a magnetic-north heading of the vehicle. However, in modified forms of the invention the scale 23a may be capable of being offset with respect to the stators of the synchros by means of a suitable adjustment so that the zero or north indication on the scale corresponds to a true-north heading of the vehicle or even to some arbitrary heading that has to be maintained by the vehicle in which the apparatus is to be mounted.

The voltage outputs of the rotors of the synchros 20, 21 are fed into a combining or correlating circuit which combines the two outputs to exercise joint control of the servo motor 26 which is geared by the gearing 27, 28 to rotate the synchro rotor shaft 22. The combining circuit includes a weighting potentiometer 24 which is energised by the output from the rotor of synchro 20. An adjustable fraction of this voltage is picked off by the wiper arm of the potentiometer to be included in series relation with the whole output from synchro 21, and the combined voltage is applied as an input to amplifier 25. This amplifier also receives a reference voltage input at 800 cycles per second having a predetermined phase relationship to the output line voltages from the detector units, and it acts as a phase discriminator to determine whether there is phase agreement or disagreement between the reference voltage and the total input signal from the combining circuit. The amplifier puts out an output voltage which runs the servo motor in one direction or the other, dependent on the phase of the total input signal, until the rotor shaft 22 arrives at a position in which the output voltages from the synchro rotors are such as to make the total input signal applied to the amplifier zero.

To consider the operation of the system, first suppose that it has been set upon a vehicle providing no deviation fields at the locations of the two detectors units; suppose also that the reference axes of the units have been set parallel to the fore-and-aft axis of the vehicle, and that the vehicle has been turned to set that axis parallel to the horizontal component H of the earth's field. This component of the earth's field therefore lies along the reference axes of both detector units. As a result, the alternating magnetic fields in the two synchros produced by the signal voltages from the detector units will be in their reference positions with respect to the stators. It follows that in every angular position of the rotor shaft 22 the two outputs from the rotor windings of the two synchros 20, 21 will be equal to one another. The servo motor will turn the rotor shaft 22 to that position in which the input to the amplifier, made up of the output of synchro 21 and of part of the output of synchro 20, is zero. But, since the two outputs are equal in all angular positions of the rotor shaft 22, the combined input to the amplifier can only become zero in that angular position of the rotor shaft in which the output voltages from the synchros are individually zero. This is the reference position of the rotor shaft, and the position in which pointer 23 is at the zero position on scale 23a. Thus, in the case considered, where, at each of the locations of the two detector units, the horizontal component of the total magnetic field is aligned with the reference axis of the detector unit there, and is merely the horizontal component H of the earth's field unaffected by any deviation field, the apparatus automatically turns the rotor shaft 22 to its reference position, and turns pointer 23 to its zero position on scale 23a.

Suppose now that the vehicle turns to a new heading making an angle with the direction of the earth's field, which angle is here denoted as $\theta$, and that the rotor shaft 22 is prevented from turning. The detector units turn with the vehicle, so that, relative to each detector unit, the earth's magnetic-field vector has turned in azimuth in the reverse sense through the same angle $\theta$ from its reference position in the detector unit. As a result, the output voltages from the three windings 13, 14, 15 of detector unit 10 change. In consequence, the line voltages transmitted to the stator windings of synchro 20 change, and the vector alternating magnetic field produced by the windings of the synchro stator turns through the angle $\theta$ about the axis of shaft 22 from the reference position of that vector relative to the stator. The axis of the rotor winding of the synchro 20 is therefore no longer in a neutral position at right angles to the direction of the alternating magnetic field of the stator, but is at an angle $\theta$ to this neutral direction. The output from each rotor winding is proportional to the component of the alternating-field vector in the stator resolved along the axis of the rotor winding.

The conditions now obtaining, and the consequent operation, may be expressed in vector notation as follows. Denote the alternating magnetic-field vector in the stator of synchro 20 by $A_1$, and the alternating magnetic-field vector in the stator of synchro 21 by $A_2$, and let $r$ denote a unit rector directed in the common direction of the axes of the two rotor windings. Then the amplitudes of the alternating voltage outputs from the rotor windings of synchros 20 and 21 are proportional respectively to the scalar product $A_1.r$ of the vectors $A_1$ and $r$, and to the scalar product $A_2.r$ of the vectors $A_2$ and $r$. In the following the constant of proportionality common to these two relationships is omitted, the outputs of the two synchros being written simply as $A_1.r$ and $A_2.r$.

The output voltage $A_1.r$ of synchro 20 is applied to potentiometer 24, the wiper of which picks off a fixed fraction of this voltage, which may be denoted as $kA_1.r$; this is added to the whole output $A_2.r$ of synchro 21 for application to amplifier 25 as the input voltage to that amplifier. For reasons explained later, the two voltages are combined in opposite senses, as is illustrated in Fig. 1 by the crossover connection of the lines from synchro 20. The total voltage applied to the amplifier can therefore be expressed as $$A_2.r - kA_1.r$$

where the quantity $k$ is now understood to be essentially positive, and the negative sign in the formula denotes that the two voltages are combined in opposite senses.

Suppose now that the rotor shaft is released, and that the servo motor 26 is rendered operative. The servo motor once again rotates the shaft to a position in which the total input to the amplifier becomes zero. This is expressed by $$A_2.r - kA_1.r = 0$$

or $$(A_3 - kA_1).r = 0$$

From this it is clear that the position of rest is that in which the direction of the vector $r$, which lies along the axis of the rotor winding, is at right angles to the vector quantity $$A_2 - kA_1$$

It may be noted that this vector quantity is a vector function of the two vectors $A_2$ and $A_1$, and is not merely a function of the directions of these two vectors since it depends on their magnitudes also.

The input quantity to the amplifier $$(A_2 - kA_1).r$$

is a function of the vector quantity $A_2 - kA_1$, being the component of this vector resolved along the common direction of the rotor windings.

It has been pointed out that, in the case under discussion where there are no deviating fields and the vehicle has turned through the angle $\theta$, both $A_2$ and $A_1$ have turned from their reference positions in the stators of the synchros 21 and 20 through the same angle $\theta$. It follows that the vector $A_2 - kA_1$ has also turned through the same angle $\theta$. Consequently the servo motor 26 must turn the rotor shaft 22 through the same angle $\theta$. Thus the pointer 23 will indicate on compass scale 23a the angle that the fore-and-aft axis of the vehicle makes with the magnetic north.

The operation as so far described, where deviating fields are supposed to be absent, would be the same irrespective of the value of $k$, and even if $k$ were zero. This latter case corresponds to use of synchro 21 only, so that synchro 20 and detector 10 could be eliminated, the system then becoming identical with the known magnetic compass system previously referred to.

Consider now the operation of the invention when deviating fields are present. It is intended that the apparatus shall be used with the detector units 10 and 11 installed on the vehicle in two positions, which we denote by X and Y, so related to the positions of magnetised materials in the vehicle that, although the deviating field $Q_1$ at X due to the magnetised materials in the vehicle varies in direction relative to the earth's field as the heading and tilt angle of the vehicle change, and although the deviating field $Q_2$ at Y due to the same magnetised materials also varies in direction relative to the earth's field as the heading and tilt angle of the vehicle change, the two deviating fields $Q_1$ and $Q_2$ vary in similar manners with changes in the heading and tilt angle of the vehicle, in such a way that $Q_1$ remains always substantially parallel to $Q_2$, and so that the magnitude of $Q_1$ bears under all circumstances substantially the same ratio to the magnitude of $Q_2$. In vector notation this condition may be expressed, if account is taken of the fact that $Q_1$ and $Q_2$ are vector quantities, by the equation $$Q_1 = KQ_2$$

where K is a constant. The point X may be taken to be the point of the pair where the deviating field is the greater. In general this means that the point X is the point of the pair nearer to the magnetised material producing the deviating field. It also means that $Q_1$ is greater than $Q_2$, and therefore that K is greater than 1.

The utility of the present invention derives from the discovery that pairs of points X and Y exist in the close vicinity of substantially all vehicles such that the above relationship $Q_1 = KQ_2$ holds good for these points, and that such pairs of points X and Y can be found without great difficulty.

To consider the effect of the deviating fields at X and Y on the operation of the system of Fig. 1 consider the hypothetical case of a vehicle in which there is initially no magnetic material, so that there are initially no deviating fields, and in which the vehicle is initially headed at an angle $\theta$ to the magnetic meridian. It has been shown that the alternating magnetic-field vectors $A_1$ and $A_2$ in the stators of synchros 20 and 21 are turned from their reference positions through the angle $\theta$. These two vectors are at this time equal in magnitude and also have the same direction, since the signal voltages determining these fields are both produced by detectors lying in the same undeviated field due to the earth's magnetism.

In this initial position $$(A_2 - kA_1).r = 0$$

or $$(1-k)A_1.r = 0$$

Now suppose that the vehicle becomes magnetised, that is, that the magnetised material of the vehicle comes into existence, producing the deviating field intensities $Q_1$ and $Q_2$ at X and Y respectively. These are vector quantities, and they combine vectorially with the earth's magnetic-field vector T present both at X and Y to produce at the two points resultant fields $T + Q_1$ and $T + Q_2$ respectively, where, in both cases, the sign $+$ denotes vector addition. The detector units respond to the horizontal components of these resultant fields. The horizontal component of the earth's field T is H. Let $S_1$ and $S_2$ denote the horizontal components of the deviating fields $Q_1$ and $Q_2$. Then the horizontal components of the resultant horizontal magnetic fields at X and Y are $H + S_1$ and $H + S_2$ respectively, where again the sign $+$ denotes vector addition. (See Fig. 3.)

The detector units respond to the vectors $H + S_1$ and $H + S_2$, which are deviated from the magnetic meridian defined by the direction of the vector H.

As has been stated, the alternating magnetic-field vectors $A_1$ and $A_2$ in the stators of synchros 20, 21 are proportional to the horizontal magnetic fields acting at the detector units, so that $$A_1 = a(H + S_1)$$

and $$A_2 = a(H + S_2)$$

where $a$ is some constant, and $H + S_1$ denotes the vector sum of $H + S_1$, and $H + S_2$ denotes the vector sum of $H + S_2$.

These equations mean that, when the magnetic field at X changes from H to $H + S_1$ the vector $A_1$ turns through the same deviation angle as that by which $H + S_1$ is turned from H, and that, when the magnetic field at Y changes from H to $H + S_2$ the vector $A_2$ turns through the same deviation angle as that by which $H + S_2$ is turned from H, while also the amplitudes of $A_1$ and $A_2$ change from being proportional to H to being respectively proportional to the magnitudes of the vectors $H + S_1$, and $H + S_2$.

As before, the input to amplifier 25 is $$(A_2 - kA_1).r$$

Using the above values of $A_1$ and $A_2$, this becomes $$[a(H + S_2) - ka(H + S_1)].r$$

or $$a[(1-k)H + S_2 - kS_1].r$$

However, we have that $Q_1$ is proportional to $Q_2$ in accordance with the equation $$Q_1 = KQ_2$$

Since $S_1$ and $S_2$ are merely the horizontal components of $Q_1$ and $Q_2$, the same proportionality must hold between them; consequently $$S_1 = KS_2$$

Therefore the input to the amplifier is $$a[(1-k)H + (1-kK)S_2].r$$

The factor $k$ is adjustable by means of potentiometer 24. Since K is greater than 1 and $k$ is variable over the range from 0 to 1 it is possible, by appropriate setting of the potentiometer, to make $kK$ equal to 1 for any given value of K corresponding to a selected pair of points X and Y. If this is done, the input to the amplifier becomes $$a(1-k)H.r$$

This expression is independent of the deviating fields, so that the input to the amplifier does not change when the deviating fields $Q_1$ and $Q_2$ come into existence at X and Y. Thus the effects of these two fields cancel each other, and do not cause the servo motor to turn the rotor shaft 22. The shaft 22 and the compass pointer 23 therefore indicate the correct heading of the craft in spite of the presence of the deviating fields. Otherwise put, the error of one of the detector units due to the deviating field system produced by the magnetised material of the vehicle is corrected by the effects that the same deviating field system produce at the second detector unit.

Figure 2:
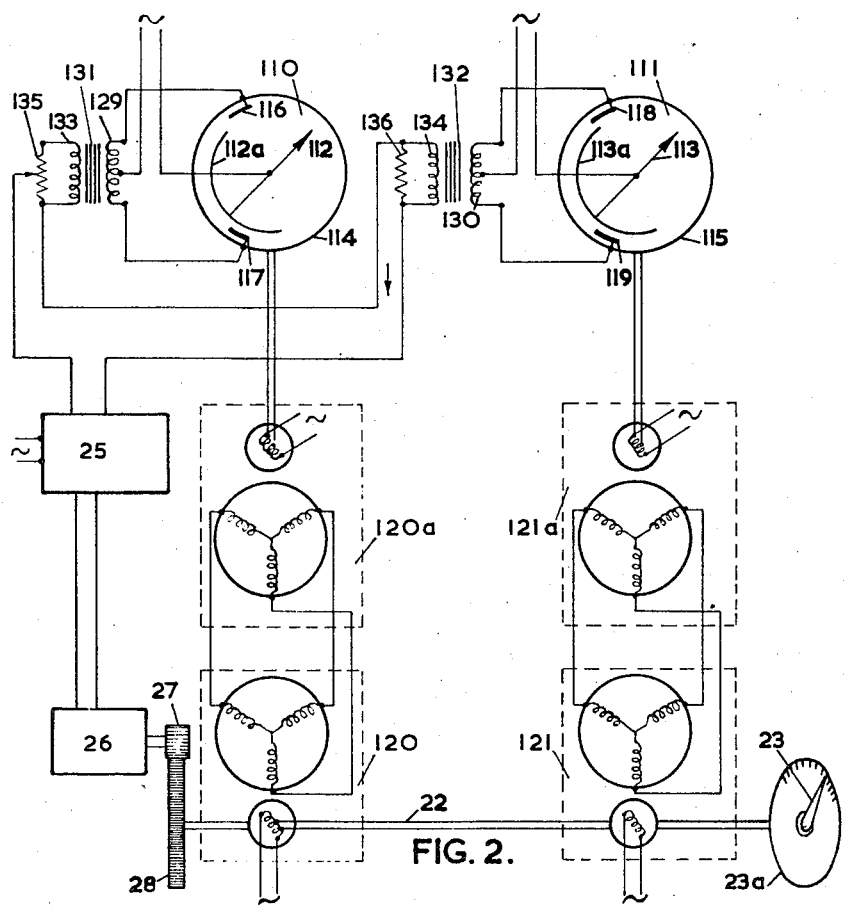
Fig. 2 illustrates diagrammatically another embodiment of the invention.

Fig. 2 illustrates diagrammatically another embodiment of the invention in which two detector units 110 and 111 are employed, each of which is of the kind that produces a single output signal voltage that measures, over a limited angle, the angular misalignment between a reference line in the detector unit and the direction of the horizontal component of the magnetic field at the location of the unit. A device that would be suitable for this purpose is a magnetometer that operates in a manner similar to the three-armed magnetometers 10, 11, of Fig. 1 but having two arms extending in diametrically opposite directions instead of three arms at 120°, and therefore providing a single signal voltage only between a single pair of output terminals and lines. However, in the system of Fig. 2 a different kind of magnetic detector unit is used, which is not of the magnetometer type. Each detector unit comprises a magnetic-compass needle 112 or 113 immersed in electrically conductive liquid in a compass bowl 114 or 115 mounted for rotation in azimuth on a base (not shown) which in turn is intended and adapted to be fixedly mounted in a vehicle.

Alternating current is fed from one leg of a source of alternating E.M.F. through the pivot of the compass needle 112 or 113 to a conductive vane 112a or 113a which is attached to the compass needle and extends arcuately through an appreciable angle about the compass pivot. The current flows from the conductive vane into the conductive liquid, and thence to two pick-off electrodes 116, 117, or 118, 119, which are bridged by the primary winding 129 or 130 of a transformer 131 or 132. The centre point of the primary winding is connected to the other leg of the source of alternating E.M.F. The pick-off electrodes 116, 117, or 118, 119 are angularly spaced in azimuth by approximately the angular length of the vane 112a or 113a. Therefore, in one relative angular position of the compass needle and the compass bowl the needle 112 or 113 will lie symmetrically between the pick-off electrodes 116, 117 or 118, 119 with the ends of the vanes 112a or 113a opposite, or nearly opposite, the associated pick-off electrode. In this position the electrical resistances formed by the paths of current flow in the liquid between the vane 112a or 113a and the two pick-off electrodes 116, 117, or 118, 119, form two arms of a balanced bridge, the other two arms of which are the two halves of the transformer winding 129 or 130. This bridge is fed across one diagonal from the alternating-current source, so that in the position of balance no difference of potential appears across the transformer winding 129 or 130. This position of balance may be referred to as the reference position of the compass bowl with respect to the compass needle.

If the magnetic needle is turned from this reference position in the compass bowl the paths of current flow in the liquid are changed, the balance of the bridge is upset, and an alternating difference of potential appears between the two pick-off electrodes of the pair 116, 117, or 118, 119. The phase sense of this alternating difference of potential relative to the phase of the alternating current supplied by the source depends on the direction in which the magnetic-compass needle has been turned from the reference position with respect to the compass bowl.

The unbalance voltages produced as described across the primary windings 129, 130 of transformers 131, 132, induce corresponding E.M.F.'s in the secondary windings 133, 134, which are applied to load resistors 135, 136, to constitute the signal output voltages of the two detector units. The resistor 135 is arranged as a variable potentiometer.

Numerous proposals have been put forward for magnetic compasses operating in a manner similar to that just described, that is, having a magnetic-compass needle immersed in conductive liquid in a compass bowl and carrying one or more conductive or insulating vanes which, when the needle turns relatively to the compass bowl, move in the vicinity of pick-off electrodes so as to change or disturb the paths of current flow through the liquid to, or from, the pick-off electrodes, thereby changing the electrical resistance of one or more paths through the liquid, and thus upsetting a normal condition of balance in a bridge circuit, to produce as a result an output signal voltage. It is therefore not necessary to describe such compasses in detail. Reference may be made, by way of example, to the magnetic compass described in British patent specification No. 409,027.

As has been stated, the signal output voltage from the detector unit 110 is applied across the potentiometer 135, which in this form of the invention is used as a weighting potentiometer corresponding to the weighting potentiometer 24 of Fig. 1. The wiper arm of potentiometer 135 picks off a fraction of the signal output voltage, the magnitude of which depends on the position in which the wiper arm is set. The output of the potentiometer is connected in series with, and opposing in sense, the full output voltage from the detector unit 111, developed across resistor 136, and the difference voltage is applied in the input circuit of amplifier 25, which, as in Fig. 1, controls the servo motor 26 to turn the corrected-compass-data shaft 22. As in Fig. 1, the shaft 22 is provided with a compass pointer 23 movable over a compass scale 23a. In Fig. 2, however, the shaft 22 is not, as in Fig. 1, the common rotor shaft for two synchro receivers 20, 21, but is the common rotor shaft for two synchro transmitters 120, 121. The single-phase windings of the rotors of these synchros are energized from a source of alternating E.M.F., while the stators have each the usual three-circuit winding similar to the stator winding of synchros 20, 21 in Fig. 1. The stator windings are connected to the similar stator windings of synchro repeater motors 120a, 121a, whose rotor windings are also energised from the same source of alternating E.M.F.

The rotors of the synchro repeater motors 120a, 121a are mechanically connected respectively to the compass bowl 114 of the detector unit 110 and to the compass bowl 115 of the detector unit 111. As a result of these arrangements the synchro-transmission system will operate when it is energised to cause the rotors of the repeater motors 120a, 121a to turn to positions corresponding to those of the rotors of the synchro transmitters 120, 121, so that the two compass bowls 114, 115 will be turned in azimuth both to the same angular position with respect to the vehicle, which position corresponds to the angular position of the corrected-compass-data shaft 22 relative to the stators of the synchro transmitters 120, 121.

We may define the reference axis of the compass bowl 114 or 115 as being that axis of the bowl which is aligned with the magnetic-compass needle when the needle is in the reference position with respect to the two electrodes 116, 117, or 118, 119, at which time these electrodes are at equal potentials and there is no signal output from the detector unit. Thus the condition for zero output from either detector unit pick-off electrodes is that the reference axis of the compass bowl is aligned with the magnetic field vector at the location of the detector unit.

Consider a case where the rotor shaft 22 of the synchro transmitters 120, 121 has such an angular position that, when the compass bowls 114 or 115 are turned by the synchro motors 120a, 121a to corresponding angular positions with respect to their bases, the reference axes of the compass bowls are parallel to the fore-and-aft axis of the vehicle. Suppose, also, that the vehicle is headed along the magnetic meridian, and that no deviation fields are acting at the locations of the two detector units. In such a case there will be zero signal voltage from the pick-off at each of the two units. Therefore there will be no input to the amplifier, and the servo motor 26 will be stationary. The angular position of the shaft 22 for which this result is obtained may be termed the reference position of the shaft 22 and the compass scale 23a may be set so that, when the shaft is in its reference position, the pointer 23 shows magnetic North on the compass scale.

If the vehicle now changes its heading, the pick-offs 116, 117 and 118, 119 of the detector units 110, 111 will provide signal outputs different from zero and equal to each other, with the result that the servo motor 26 rotates the data shaft 22. The synchro motors 120a, 121a rotate the compass bowls 114, 115 correspondingly. The process goes on until the reference axes of the compass bowls 114, 115 are once again aligned with the magnetic meridian. This will happen when the shaft 22 has turned from its reference position through the same angle as that through which the vehicle has turned from the magnetic meridian. The pointer 23 will therefore show the heading of the vehicle.

Consider now the effects of deviating fields. For this purpose suppose at first that the detector units 110, 111 are located at the two points X, Y previously considered in connection with Fig. 1, and take account of the deviating fields at these points by supposing that no deviating fields were present up to an instant at which deviating fields $Q_1$, $Q_2$ suddenly come into existence. As a result of the coming into existence of these deviating fields the resultant-field vectors at X and Y change direction; electrodes 116, 117 of the detector unit 110 respond by providing an output-signal voltage that is a measure of the deviation angle at the point X; similarly the electrodes 118, 119 of the detector unit 111 provide an output-signal voltage that is a measure of the deviation at the point Y. As in that system of Fig. 1, these signal voltages are combined, or correlated, in the input circuit to amplifier 25, the correlation being effected so that the former voltage is weighted in relation to the latter voltage, the weighting factor $k$, or, rather, $-k$, being determined by the setting of potentiometer 135. Consequently the servo motor 26 turns the data shaft 22 through a small angle. Ideally, if the correction means were such as to correct the deviation exactly, shaft 22 should not turn at all but should be held in the same angular position as in the absence of deviating fields. However, in the system of Fig. 2 the correction is not exact, and the shaft 22, and therefore the compass bowls 114, 115 do turn through a small angle which is a residual error of the system.

If the deviation angles at X and Y are denoted by $\theta_1$ and $\theta_2$, and the residual error angle is denoted by E, the position of rest of the system is determined as that in which the total input signal to the amplifier becomes zero. The output signals from the detector units are proportional to the unbalance voltages appearing across the pick-off electrodes 116, 117, or 118, 119. These are approximately proportional to the angles that the compass needles make with the reference axes of their compass bowls, provided that these angles are small. In the position of rest these angles are $\theta_1-E$ and $\theta_2-E$ respectively. Since the pick-off signals are proportional to these angles, the total input signal to the amplifier is therefore proportional to $$(\theta_2-E)-k(\theta_1-E)$$

which becomes zero when $$(1-k)E=\theta_2-k\theta_1$$

Figure 3:
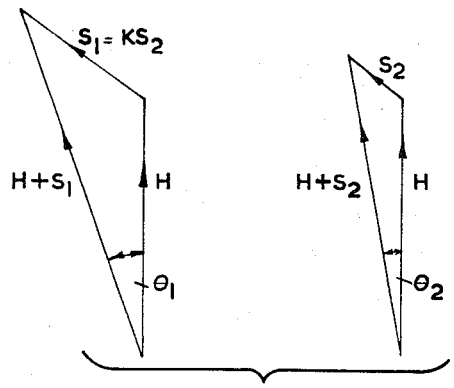
Fig. 3 is a vector diagram of the earth's field, the deviating fields and the resultant fields at the two detector locations.

The deviation angle $\theta_1$ is produced by adding the vector $S_1$, i.e. $KS_2$, vectorially to the vector H, and is not exactly equal to K times the deviation angle $\theta_2$ produced by adding the vector $S_2$ vectorially to the vector H (see Fig. 3). However, if X and Y are points such that the larger deviating fields $KS_2$ at the point X is considerably smaller than the earth's field, so that the deviation angle there is small, the error in taking $\theta_1$ to be equal to $K\theta_2$ is small. Therefore, by adjusting $k$ so that $kK=1$ we obtain $$(1-k)E=0$$

with only a small error. Consequently, provided also that $1-k$ is not small, that is to say, provided that the deviating field at Y is considerably smaller than the deviating field at X, so that their ratio, measured by the factor K, is of the order of magnitude of 2, or is greater than 2, it follows that E is approximately zero. Thus the error angle to which the system of Fig. 2 adjusts the corrected-compass-data shaft 22 in response to the deviating fields is very small—certainly very much smaller than the uncorrected deviations at either of the points X and Y.

The system of Fig. 2 may be regarded as computing corrected compass data, obtained as the angular position of shaft 22, on the assumption that the deviation angles at the locations of the detector units are in the ratio of K to 1. It has been shown that the errors of the system are small if the detector units are located at points X, Y at which the deviating-fields themselves are in the ratio K to 1. It will generally be possible to find a position X' in the vicinity of X, or to find a position Y' in the vicinity of Y, such that the system of Fig. 2 has smaller errors for positions X' and Y, or for positions X and Y', than for positions X and Y. Thus the system of Fig. 2 may in practice be arranged to give corrected compass data that are even more free from the effects of deviation errors than appears from the analysis given above.

An alternative possible embodiment of the invention may be realised using transmitting magnetic compasses as the magnetic-field-detector units of the invention instead of the magnetometer units 10, 11, in an arrangement otherwise similar to that of Fig. 1. Transmitting magnetic compasses of several kinds have been proposed which, in one way or another, utilise the angular position of a magnetic-compass needle to control the distribution of current into, or the generation of E.M.F.'s in, two or more signal channels, in such a way that these currents or E.M.F.'s vary continuously with angular position of the compass needle in a compass bowl or container throughout the range of 360° of possible angular positions. In some of these proposals, as for example in the magnetic compass of specification 409,027 already referred to, the compass bowl is turned in azimuth by a servo motor to follow the magnetic-compass needle, and thus always keep a reference line in the compass bowl aligned with the magnetic meridian (in the absence of deviating fields). In such compass systems a synchro transmitter may be driven by the compass bowl to transmit a plurality of signal voltages to a remote synchro receiver. Two magnetic compasses of this kind may be used as the magnetic-field detectors in a system according to the invention, and the signal voltages from the transmitters associated with the two compasses respectively may be supplied to two synchro receivers similar to the receivers 20, 21 of Fig. 1, arranged to operate a common shaft 22 by means of a servo motor 26 in the same manner as in Fig. 1.

In an alternative embodiment of the invention using transmitting magnetic compasses as the detector units the transmitting magnetic compass is of a different type, in which the compass bowl is intended to be mounted on the vehicle in a fixed azimuth relationship with respect to the fore-and-aft axis of the vehicle, and in which the compass data are derived by a multiple controlling action exercised by the magnetic compass on a plurality of circuits. For example, the magnetic-compass needle, by its angular position in the compass bowl, may control the electrical resistances of a plurality of current paths through a conducting liquid, or may control a plurality of inductive circuits or a plurality of capacitive impedances in a plurality of high-frequency current circuits. The variations in the resistances or impedances in electrical circuits, produced when the needle turns relatively to the compass bowl, are used to control the magnitudes of output voltages applied in a plurality of circuits, so that these voltages may constitute compass data. Here again, a number of transmitting compasses of this type have been proposed in the past. Generally the output voltages are produced by devices so designed that the voltages are suitable for application to a suitably wound synchro receiver to determine the angular position of a resultant alternating magnetic field in the stator of the receiver.

Examples of such proposals are the transmitting compasses illustrated in U.S. Patent 2,593,973, and in U.S. Patent 2,363,500. Generally, such known transmitting compasses may be used instead of the detector units 10 and 11 of Fig. 1, and the compass data provided by them may be received by suitably wound synchros corresponding to the synchros 20, 21, the modified system operating in much the same manner as that of Fig. 1, but with slightly changed results.

In the embodiments that use transmitting magnetic compasses, as contrasted with magnetometers, for the detector units, the correction of the deviation error by the method of the invention is approximate only and not exact, since these systems compute the correction on the same basis as the system of Fig. 2.

It may be desirable in certain circumstances to use more than two detector units, and the present invention extends to such cases. For example, in applying the invention to provide a deviation-corrected compass system in a particular vehicle, it may happen that there is no convenient pair of points X and Y having the desired property that the deviating fields at X and Y are in a constant ratio, K differing appreciably from 1. It may happen that, for such a pair, one of the points is convenient for mounting a detector unit there, and the other is inaccessible without erecting otherwise unnecessary elaborate structures on the vehicle, or is at a place where there is already some equipment or structural part of the vehicle. In such cases it may be convenient to replace one detector unit, say at the point Y, by two detector units spaced on opposite sides of the point Y, using the two units to produce a signal voltage equivalent to that which would be produced by a single unit located at Y.

Furthermore it may be found that at one pair of convenient points X, Y the deviating fields are approximately, but not exactly, in a constant ratio K, and that at another pair X', Y' there is similarly only an approximation to a constant ratio which may be the same quantity K or a different quantity K'. The principle of the invention, if applied in a system using a single pair of detector units at X and Y, would not give exact compensation, so that residual small errors, varying with the heading of the vehicle, would be present in the data. Similar results would be obtained by using detector units located at X' and Y'. In such a case it would be possible, by using one pair of detector units located at X and Y and another pair of units located at X' and Y', and by using a correlating circuit that operates in dependence on the outputs of all four units, and in which suitable weighting factors are attached to at least three of them, to obtain better results than with one pair of detector units only.

The magnetic-compass system of the invention, like other magnetic compasses, may be regarded from two points of view. According to the first point of view it serves to determine the heading of a vehicle, or possibly of some object whose position in azimuth on a vehicle may be varied, with respect to the magnetic north. According to the second point of view it serves to determine the direction, in a horizontal plane of the horizontal component of the earth's magnetic field with respect to a horizontal reference line in a detector unit, or with respect to parallel reference lines in a plurality of detector units. It performs this task because each detector unit responds only to that component of the magnetic field at the location of the detector which lies in a particular plane of the detector unit and because the detector unit is maintained with that plane horizontal. Thus, in the system of Fig. 1 the magnetic-field detectors respond only to the magnetic field in the plane formed by the three arms of the detector device, which is maintained horizontal.

According to a modification of the invention a modified version of the system of Fig. 1 is used, in which the two detector units are maintained each with the plane of its three arms in the meridian plane at its location, for example, by being pendulously mounted in a support that is controlled in azimuth to maintain a fixed orientation with respect to the magnetic-north direction as ascertained by a magnetic-compass system such as that of Fig. 1. In this modification of the invention the apparatus is in other respects similar to that of Fig. 1. It then operates to determine the direction of the earth's field in a meridian plane parallel to the planes of the two detector units. Such an arrangement is therefore a dip-angle meter. If the two detector units are installed on a vehicle at locations X, Y, where the deviating-field vectors are in the ratio of K to 1, then, in the same manner as for the magnetic-compass system of Fig. 1, the system can be made to provide a measure of dip angle corrected for effects of the deviating fields simply by setting the potentiometer 24 to give an output that is a fraction $k$ of its input equal to $1/K$.

I claim:

1. A compass system for providing a measure of the true heading of a supporting craft with respect to the earth's magnetic field from measures of the direction of the total magnetic fields of the craft derived at spaced points thereon each latter measure being in error by an amount dependent upon the magnetic field deviations produced by the craft itself, the directions of said deviation fields at said points being the same but their magnitudes being different by a predetermined fixed ratio for all craft headings, said system comprising magnetic field sensors at each point for sensing the direction of the total magnetic field thereat, signal generating means coupled with said sensors for providing signals in accordance with said sensed directions and constituting measures of direction differing only in accordance with the difference in the magnitudes of said deviation fields, circuit means for modifying one of said signals in accordance with said predetermined fixed ratio, motor means responsive to said modified signal and the other of said signals for providing an output in accordance with the difference therebetween, and means coupled with the output of said motor means for jointly positioning each of said signal generating means through an angle such that said difference is reduced to zero, said angle being said measure of the true magnetic heading of said craft.

2. Apparatus as set forth in claim 1 wherein each of said magnetic field sensors comprises a magnetic needle responsive to the total magnetic field at said points, each of said signal generating means comprises a pick-off having one element fixed to said needle and another element rotatably mounted on said craft, each of said signals being proportional to the relative positions of said elements, and wherein the means coupled with the output of said motor means includes means for jointly positioning said other elements of said pick-offs.

3. Apparatus as set forth in claim 1 wherein each of said magnetic field sensors comprises a flux valve for producing a resultant electrical vector proportional to the direction of the total magnetic field at said points, each of said signal generating means comprises a synchro having stator and rotor elements, each of said stator elements being connected with said flux valves for reproducing therein said electrical vector, each of said rotors having induced therein a component of said electrical vector the magnitude of which is dependent upon the angular orientation of said rotor with respect to said stator, and wherein said means coupled with the output of said motor means includes a shaft for jointly angularly positioning the rotors of said synchros.

4. Apparatus for determining the direction of the earth's magnetic field comprising a plurality of similar magnetic field detectors adapted to be mounted separately at spaced locations on a supporting vehicle and each adapted to provide compass data defining the direction of the substantially horizontal component of the earth's field at each location, such data including errors produced at each location by substantially horizontal deviating magnetic field components, the directions of said deviating fields at each location being the same but the magnitude thereof being different by a predetermined constant ratio for all vehicle headings, and means responsive to both detectors for providing a measure of the true magnetic heading of the vehicle, said last-mentioned means comprising a motor and a shaft driven thereby, a pair of synchros each having a rotor positioned by said shaft and a stator fixed to the vehicle, each stator being coupled with a respective one of said detectors for producing in each a resultant field corresponding to the total horizontal component of the magnetic field detected by each detector and adapted to produce in the rotors thereof signals corresponding to the direction of the resultant fields in each stator, circuit means responsive to the signal of one of said rotors for modifying the same in accordance with said predetermined constant ratio, means connected to receive said modified signal and the signal from the other of said rotors for producing a control signal proportional to the algebraic sum thereof, and means for controlling said motor in accordance with said control signal, the position of said shaft providing a measure of said true magnetic heading.

5. Apparatus for determining the direction of the earth's magnetic field comprising a plurality of similar magnetic field detectors adapted to be mounted separately at spaced locations on a supporting vehicle and each adapted to provide compass data defining the direction of the substantially horizontal component of the earth's field at each location, such data including errors produced at each location by substantially horizontal deviating magnetic field components, the directions of said deviating fields at said locations being the same but the magnitude thereof being different by a predetermined constant ratio for all vehicle headings, means responsive to both detectors for providing a measure in accordance with the true magnetic heading of the vehicle, said last-mentioned means comprising a pair of synchros each having a rotor and a stator, each stator being coupled with a respective one of said detectors for producing in each a resultant field corresponding to the total horizontal component of the magnetic field detected by each detector and adapted to produce in the rotors thereof signals corresponding to the direction of the resultant fields in each stator, circuit means responsive to the signal of one of said rotors for modifying the same in accordance with said predetermined constant ratio, a motor connected jointly to drive the rotors of said synchros, and means connected to receive said modified signal and the signal from the other of said rotors for controlling the motor in accordance with the difference between said signals whereby said motor will drive to a position at which the signal outputs of said rotors balance, said position being a measure of the true magnetic heading of the vehicle.

6. Apparatus for determining the direction of the earth's magnetic field comprising a plurality of similar magnetic field detectors adapted to be mounted separately at spaced locations on a supporting vehicle and each adapted to provide compass data defining the direction of the substantially horizontal component of the earth's field at each location, such data including errors produced by deviation fields at each location produced by deviating magnetic fields also having a substantially horizontal component, the directions of said deviation fields at said locations being the same but the magnitude thereof being different by a predetermined constant ratio, means responsive to both detectors for providing an output in accordance with the true magnetic heading of the vehicle, said last-mentioned means comprising a pair of synchros each having a rotor and a stator, each stator being coupled with a respective one of said detectors for producing in each a resultant field corresponding to the total horizontal component of the magnetic field detected by each detector and adapted to produce in the rotors thereof signals corresponding to the direction of the resultant fields in each stator, means connected to receive the signals from said rotors including means for modifying one of said signals in accordance with said predetermined ratio, and motor means responsive to the output of said last means for jointly driving both said rotors in a direction and an amount to reduce said output toward zero.

References Cited in the file of this patent

UNITED STATES PATENTS

| | | |
|---|---|---|
| 2,383,461 | Esval et al. | Aug. 28, 1945 |
| 2,393,670 | White | Jan. 29, 1946 |
| 2,581,436 | McCarthy | Jan. 8, 1952 |